No. 724,102. PATENTED MAR. 31, 1903.
H. C. HORSTMANN.
ELECTRIC FLASHER AND CIRCUITS THEREFOR.
APPLICATION FILED MAR. 28, 1902.
NO MODEL. 7 SHEETS—SHEET 2.

No. 724,102. PATENTED MAR. 31, 1903.
H. C. HORSTMANN.
ELECTRIC FLASHER AND CIRCUITS THEREFOR.
APPLICATION FILED MAR. 28, 1902.
NO MODEL. 7 SHEETS—SHEET 3.

Witnesses:
Harry B. White
Ray White

Inventor:
Henry C. Horstmann
By Charles M. Wells
Atty.

No. 724,102. PATENTED MAR. 31, 1903.
H. C. HORSTMANN.
ELECTRIC FLASHER AND CIRCUITS THEREFOR.
APPLICATION FILED MAR. 28, 1902.
NO MODEL. 7 SHEETS—SHEET 4.

Witnesses
Harry R. White
Ray White

Inventor
Henry C. Horstmann
By Charles M. Hill
Atty.

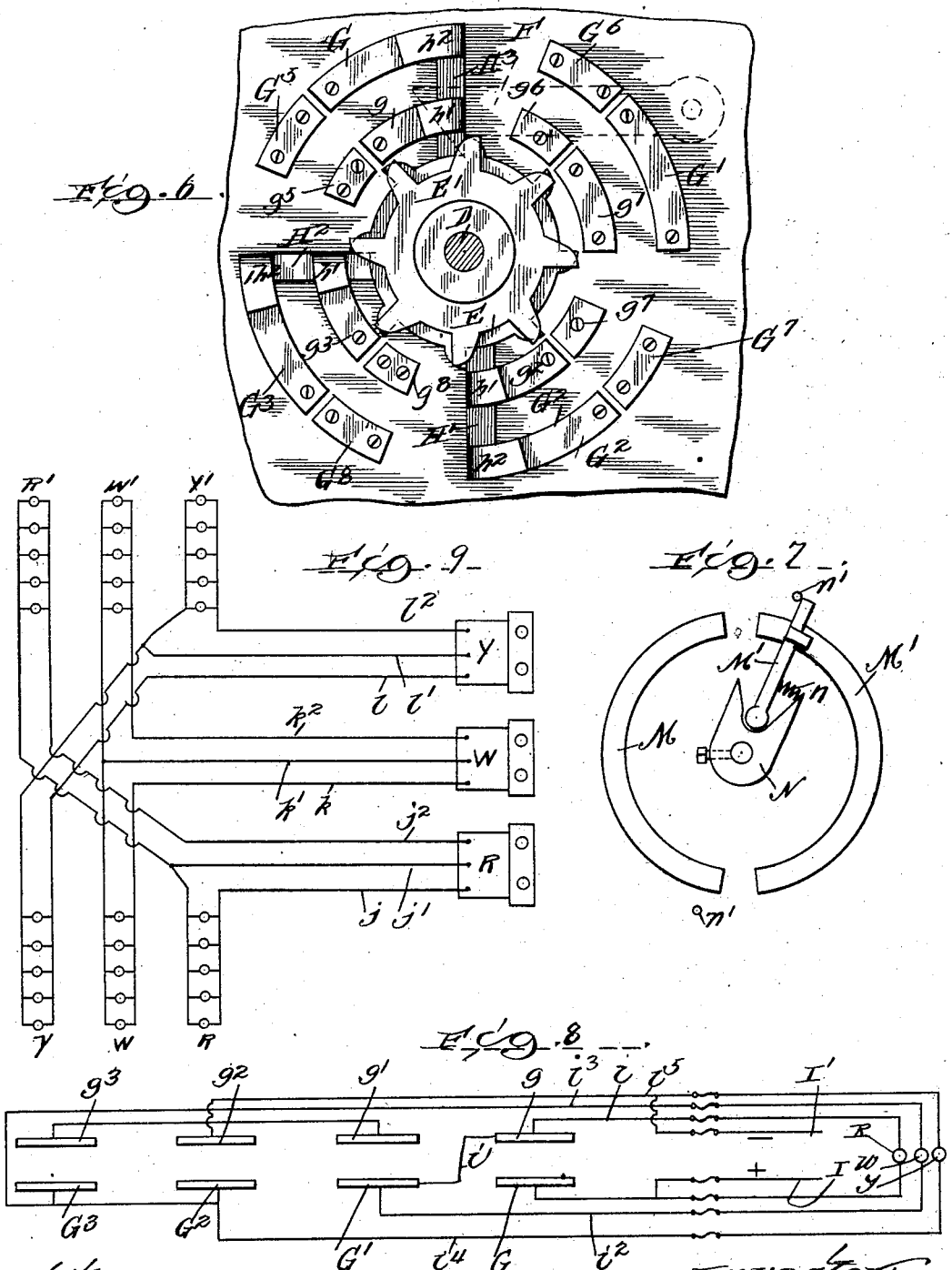

No. 724,102. PATENTED MAR. 31, 1903.
H. C. HORSTMANN.
ELECTRIC FLASHER AND CIRCUITS THEREFOR.
APPLICATION FILED MAR. 28, 1902.
NO MODEL. 7 SHEETS—SHEET 6.
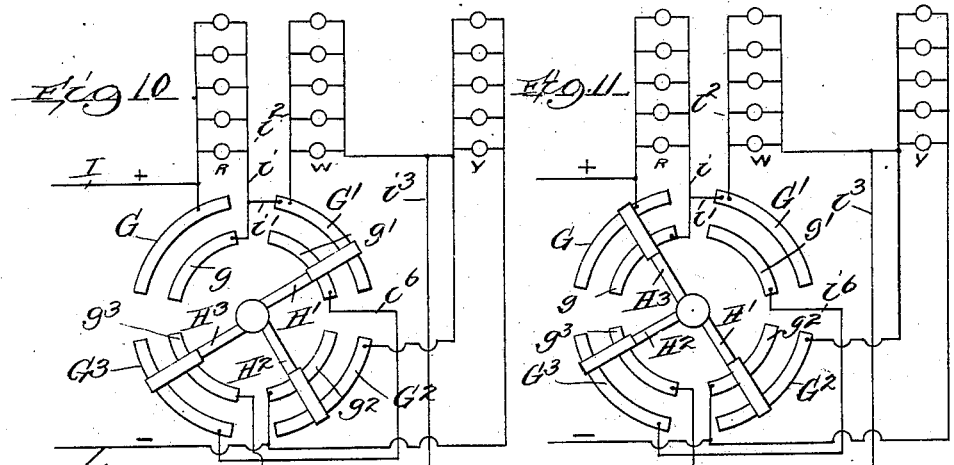
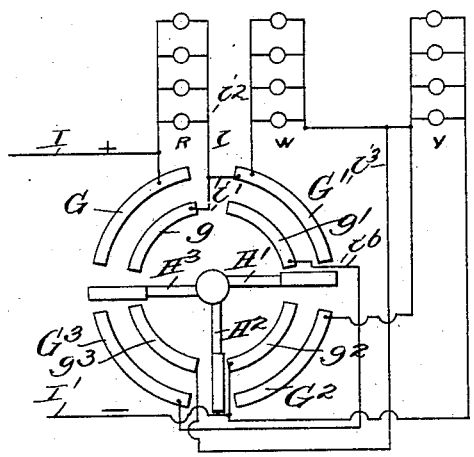
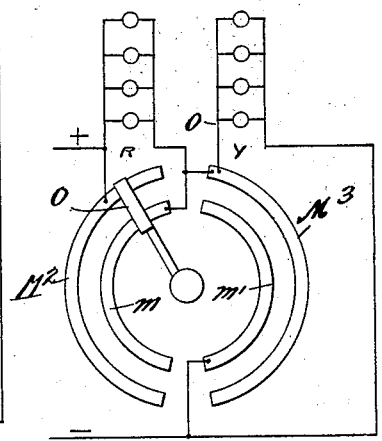
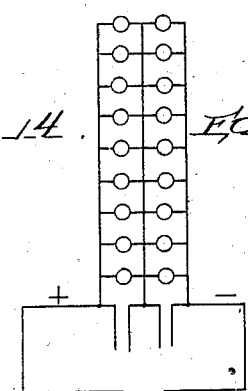
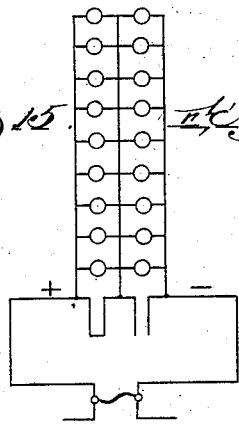
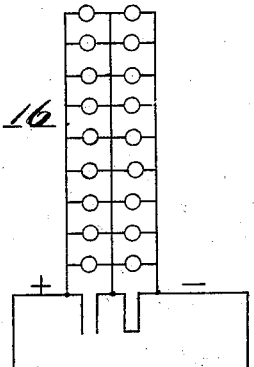
Witnesses
Inventor
Henry C. Horstmann
By Charles M. Hill, Atty.

UNITED STATES PATENT OFFICE.

HENRY C. HORSTMANN, OF CHICAGO, ILLINOIS.

ELECTRIC FLASHER AND CIRCUIT THEREFOR.

SPECIFICATION forming part of Letters Patent No. 724,102, dated March 31, 1903.

Application filed March 28, 1902. Serial No. 100,380. (No model.)

*To all whom it may concern:*

Be it known that I, HENRY C. HORSTMANN, a citizen of the United States, and a resident of the city of Chicago, in the county of Cook and State of Illinois, have invented certain new and useful Improvements in Electric Flashers and Circuits Therefor; and I do hereby declare that the following is a full, clear, and exact description of the same, reference being had to the accompanying drawings, and to the letters of reference marked thereon, which form a part of this specification.

This invention relates to improvements in electric flashers and circuits therefor, and is shown more particularly in connection with flashers of improved type designed to produce various colors or other effects for signs or the like, each flasher operating a plurality of electric circuits, the lights of each circuit being different-colored or otherwise differentiated.

Heretofore in most of the electric sign-flashers the sparking occasioned by breaking the circuits has proven very destructive to the devices, necessitating expensive repairs and renewals.

The object of this invention is to provide a cheap, simple, and positively-acting means designed to operate and to control a plurality of circuits and so constructed and so connected in the circuits as to do away almost entirely with sparking.

The invention embodies many novel features; and it consists in the matters hereinafter described, and more fully pointed out and defined in the appended claims.

Figure 1:
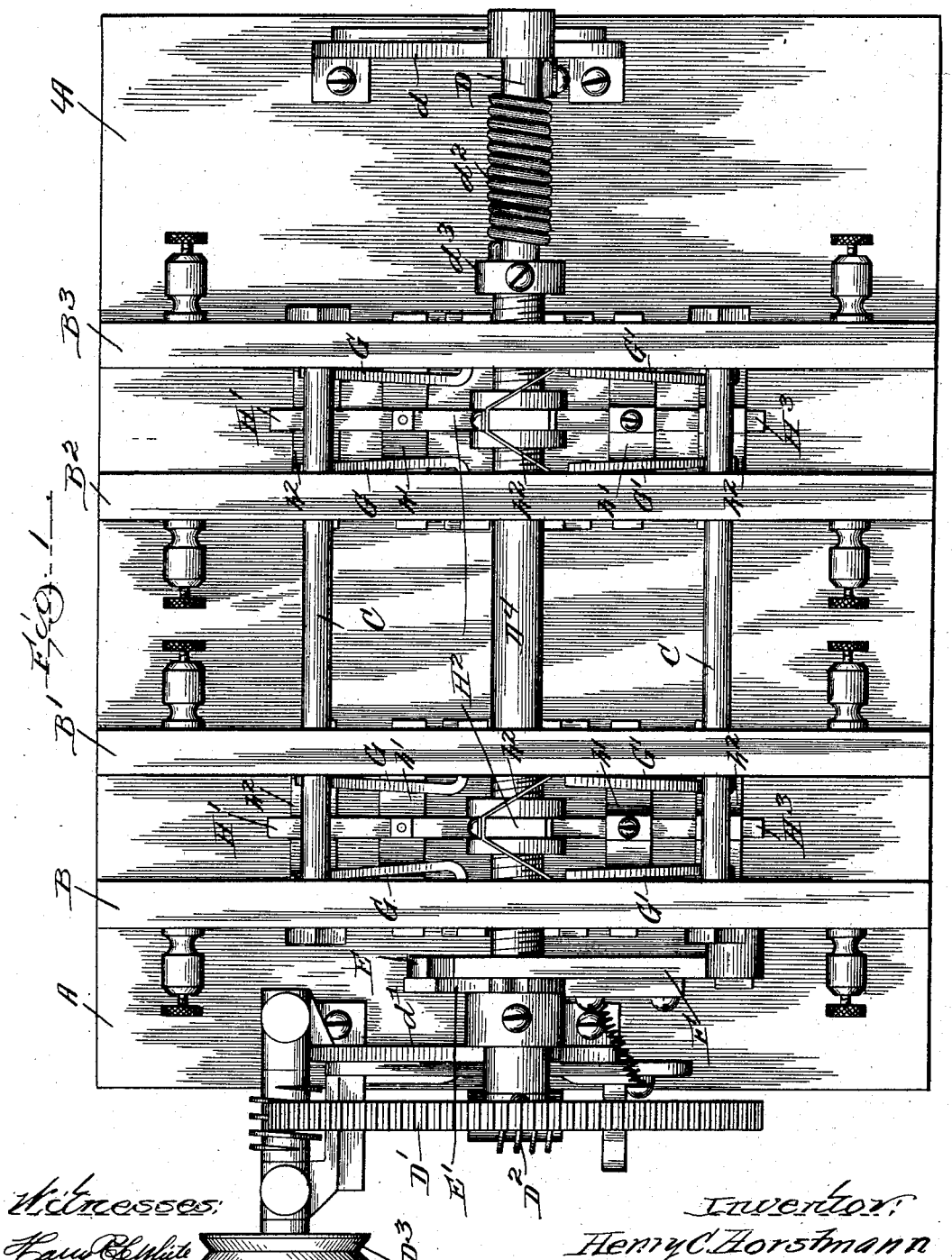
Figure 2:
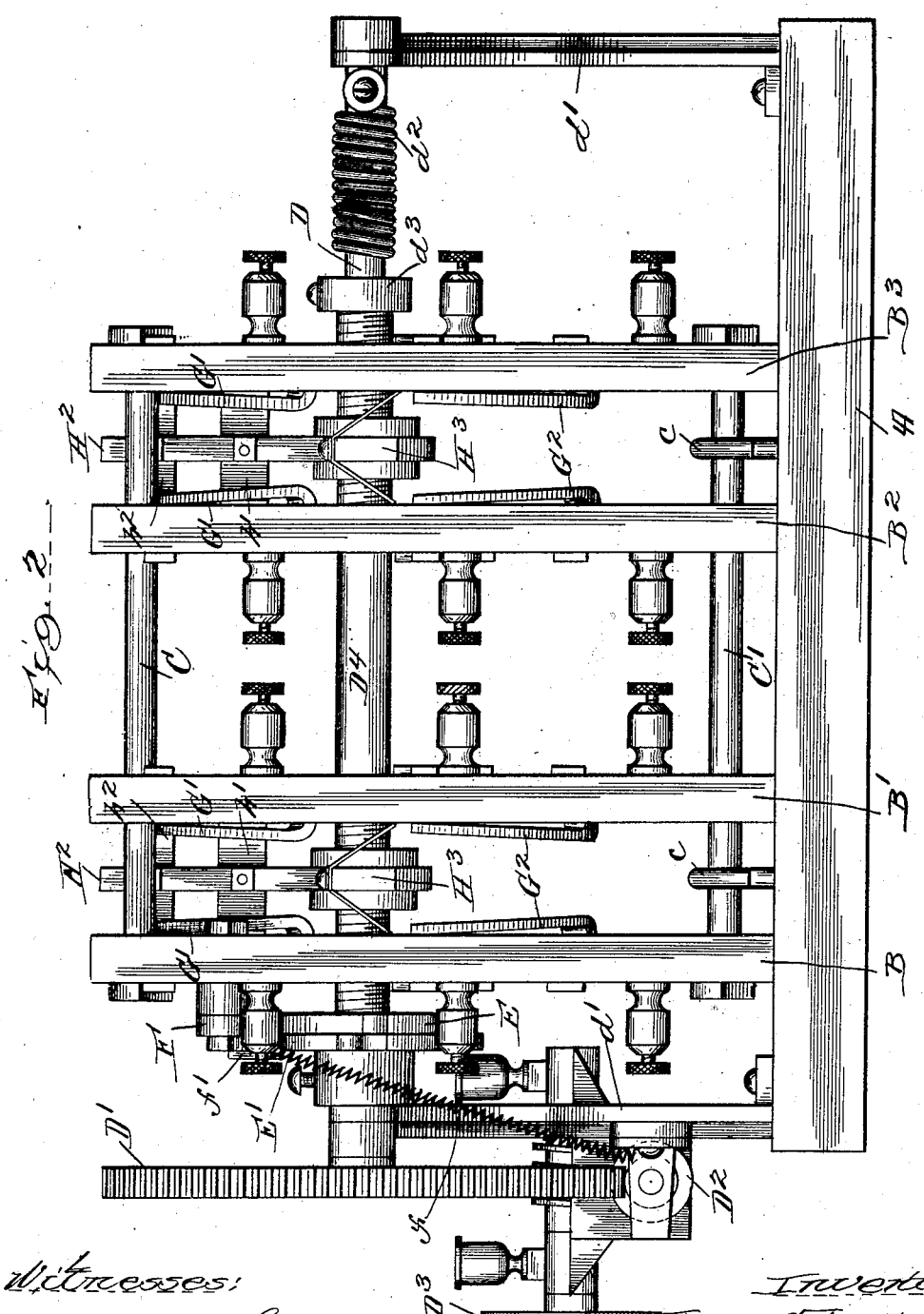
Figure 3:
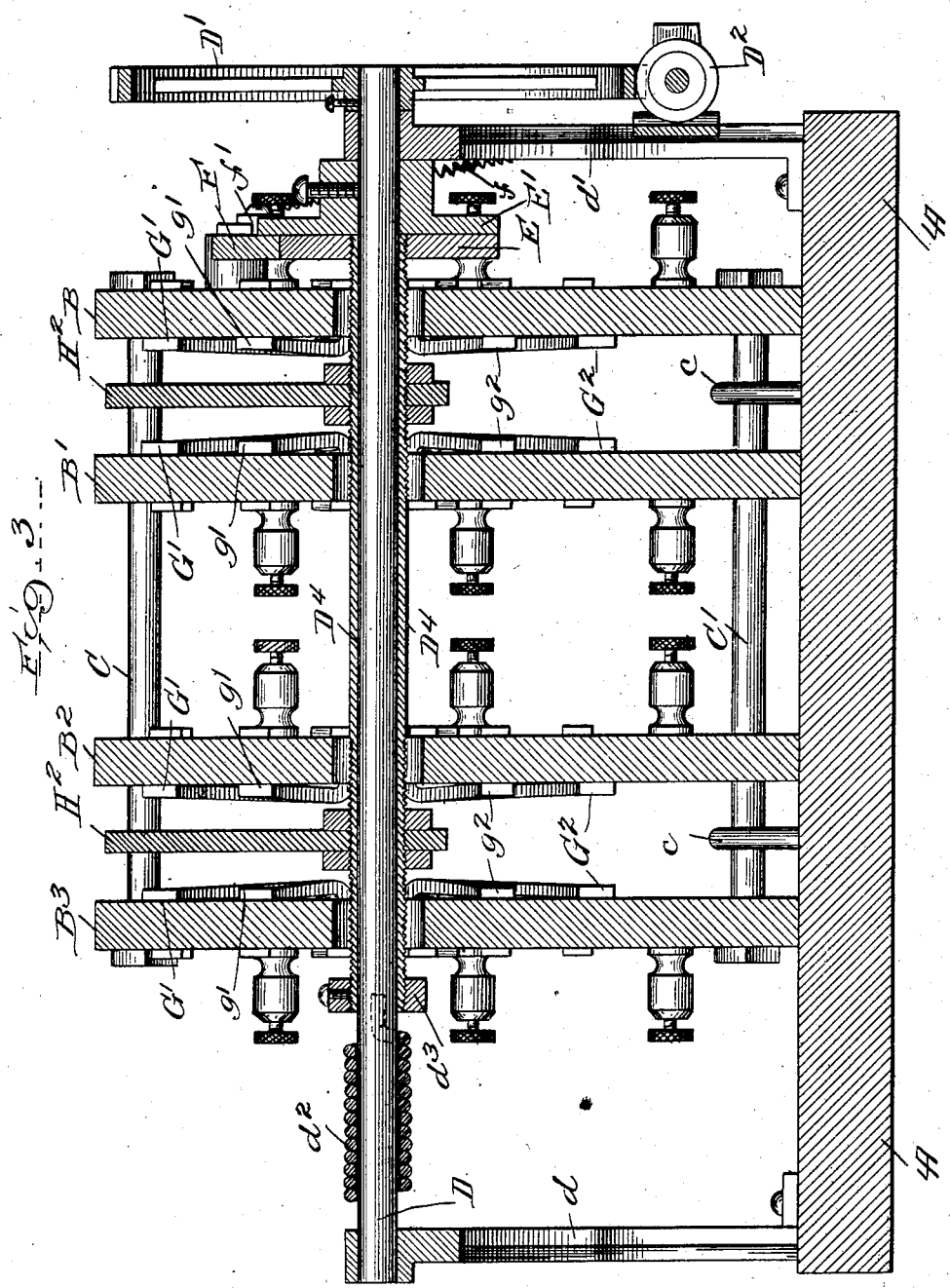
Figure 4:
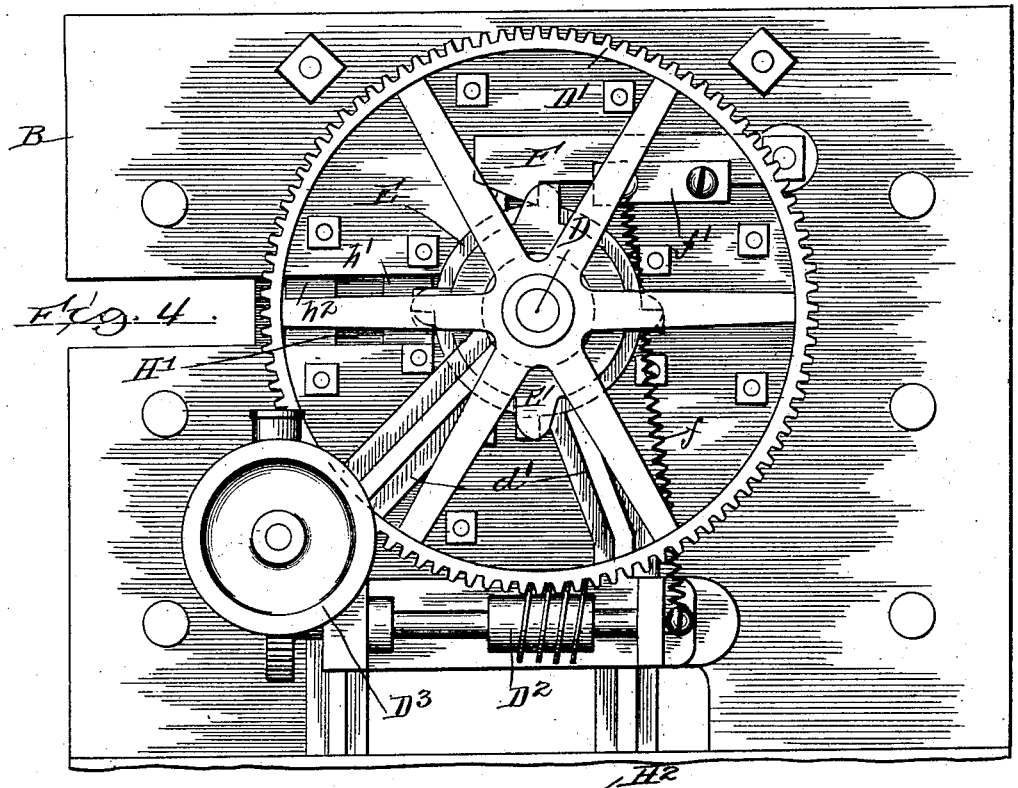
Figure 5:
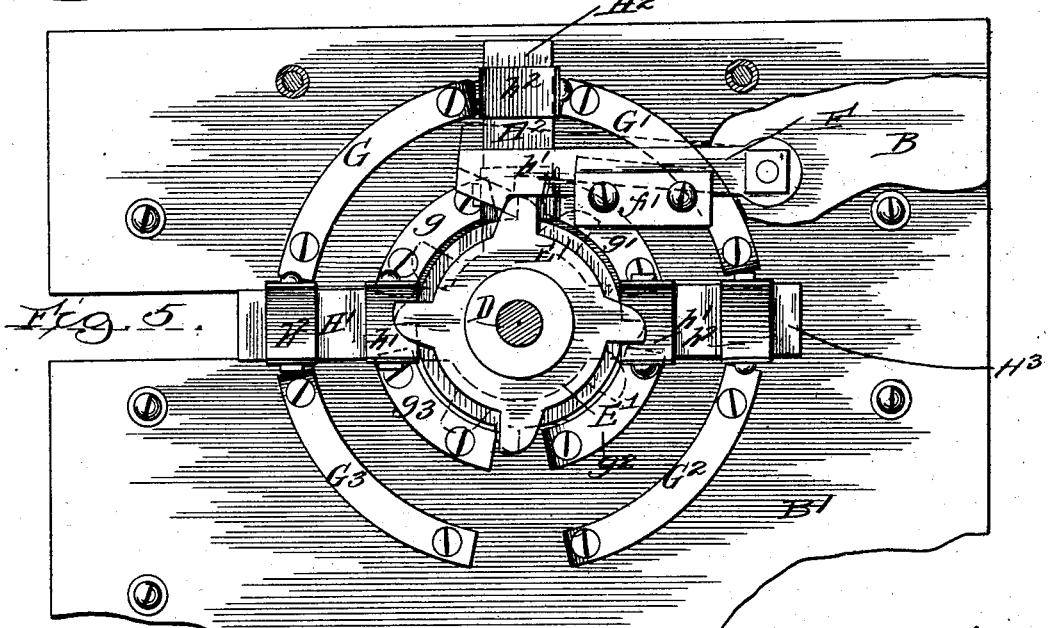

In the drawings, Figure 1 is a top plan view of a flasher embodying a part of my invention. Fig. 2 is a front elevation of the same. Fig. 3 is a vertical longitudinal section taken along the shaft and showing the shaft in elevation. Fig. 4 is an end elevation of the same. Fig. 5 is a fragmentary vertical section, partly broken away. Fig. 6 is a view in elevation of a modified arrangement of the contact-plate. Fig. 7 is a diagrammatic view of a modified form of the circuit-breaker. Fig. 8 is a diagrammatic view of flashers shown in Figs. 1, 2, 3, and 4 and the wiring therefor. Figs. 9 to 22, inclusive, are diagrammatic views of the various arrangements of circuits and the operation thereof by my improved flasher.

In said drawings, referring first to the flasher mechanism, A indicates a base of any desired material, having secured thereon in an upright position parallel insulating-plates B, B', B$^2$, and B$^3$, which may be of any desired material.

C and C' indicate rods which extend horizontally through said plates and serve to bind the same firmly together, as indicated in Figs. 1 and 2 and 3, and the lower of which serve to afford attachment with the base by means of the screw-hooks $c$, which extend upwardly through the base A and engage over said rods. Said plates are arranged in pairs, plates B and B' forming one pair and B$^2$ and B$^3$ forming another. A shaft D extends centrally through said plates and, as shown in Figs. 2, 3, and 4, is journaled at its end on standards $d\ d'$, rigidly secured on the base. On the end of the shaft, adjacent to the standard $d'$, is the gear-wheel D'. Said gear-wheel, as shown, meshes with a worm D$^2$, adapted to be driven from the pulley D$^3$, actuated from any source of power. Secured on said shaft and of a length sufficient to extend through said plates is the comparatively close fitting sleeve D$^4$, which is yieldingly attached to the shaft by means of a spring $d^2$, herein shown as a coil-spring, one end of which is rigidly secured on the shaft, as indicated in Fig. 2, and the other end of which is secured at the end of the sleeve by means of a collar $d^3$. At the opposite ends of said sleeve, or adjacent to the gear-wheel D', is provided a ratchet-wheel E, provided with a plurality of teeth thereon. Rigidly secured on the shaft with its face in contact with the ratchet-wheel E is a similar ratchet-wheel E', which has the same number of teeth as the wheel E.

F indicates a pawl or detent pivoted on the plates B and extending over the ratchet E into position to engage the teeth thereof. Said pawl is normally held in position to engage the teeth of the ratchet-wheel E by means of a pulling-spring $f$, which is engaged thereon and also engaged on any rigid part of the frame. A projection $f'$ on the side of the pawl extends laterally therefrom into position to be engaged by the teeth of the ratchet-wheel E', as shown in Figs. 4 and 5.

From the construction described it will be evident that the gear-wheel D' is rotated continuously from any source of power. The pawl engaging one of the teeth of the ratchet-wheel E holds the sleeve from rotation until the next succeeding tooth of the ratchet-wheel E' engages beneath and lifts the pawl and allows the sleeve $D^4$ to make a partial revolution, its movement continuing under the action of the spring until the next tooth on the ratchet-wheel E engages the pawl. In the construction shown four such teeth are provided on each ratchet-wheel. It thus follows that each successive movement of the sleeve is ninety degrees, or one-fourth of a complete revolution.

On the inner or adjacent faces of the pairs of plates B B' or $B^2 B^3$ are metallic contact-plates, which, as shown in Fig. 5, are arranged concentric with said shaft and comprise an inner and an outer series of curved or segment-shaped strips of metal at different radial distances from the shaft and the like ends of adjacent strips in the different series lying on the same radius. Said plates are indicated, respectively, by G $g$, G' $g'$, $G^2$ $g^2$, $G^3$ $g^3$, of which the inner contact-plates are indicated by the smaller letters and the outer contact-plates by the capital letters. Each contact-plate is electrically connected with its binding-post, of any desired type, which in the construction shown is secured on the opposite side of the upright therefrom.

Between the members of each pair of uprights and the contact-plates therefor and rigidly secured on the sleeve $D^4$ are rotary brushes, each comprising a central hub H, rigidly secured on the sleeve and having secured thereon a number of radial arms of insulating material arranged at an angle with each other corresponding with the arrangement of the plates and numbering one less arm than there are contact-plates in a series. In the construction shown there being but four contact-plates in each series, there are but three of said arms, which are arranged at a right angle with each other and are indicated by H', $H^2$, and $H^3$. Rigidly secured on each arm in position to afford positive engagement with the contact-plate of each side thereof are the brushes $h' h^2$, comprising strips of resilient metal, the ends of which engage on the corresponding contact-plates on opposite sides thereof at the same time. The operation of this portion of my device is as follows: The binding-posts being electrically connected in any desired manner and the shaft caused to revolve the intermittent movement of the sleeve causes the brushes on each arm to sweep along the contact-plates, providing positive electrical connection therewith to near the end of said plates, whereupon the pawl or detent engages the ratchet-wheel E and holds the same momentarily or until the gear-wheel and shaft make one-fourth of a revolution. One of the teeth of the ratchet-wheel E' now engages beneath the pawl, lifting the same, whereupon the spring $d^2$ acts to permit a partial revolution of the sleeve, carrying the brushes quickly over the intervening space between adjacent contact-plates. Inasmuch as the brushes are rigidly connected by means of the arms, it follows that all the brushes break contact with the contact-plate at the same time and almost simultaneously make contact with the adjacent contact-plates. The circuits are so arranged, as hereinafter described, that at the moment the contact is broken the current passes through a parallel light-circuit, or a plurality of such light-circuits, thus leaving a path of higher resistance open to the current. This and also the break occurring simultaneously at a number of points prevents any appreciable spark as a consequence of breaking the contact. When, however, contact is made again by the brushes with the contact-plates, one or more of the light-circuits are cut out or short-circuited and the current is made to pass through predetermined light-circuits. Obviously any desired number of contact-plates may be arranged as described, if preferred, instead of four, the number of ratchets being increased proportionately with the number of contact-plates secured on each upright. If preferred, also, one or more of the contact-plates may have one or more insulated portions $G^5 G^6 G^7 G^8$ and $g^5 g^6 g^7 g^8$, as shown in Fig. 6, so that if the brushes are brought to rest on said sections the circuits will be all in series, causing a comparatively dark interval between the lighting of different circuits.

Referring now to the arrangement of the circuits as shown in Fig. 8, in which the flasher is shown diagrammatically with the circuits, all of which are connected in series, and also to the diagrammatic views Figs. 10, 11, and 12, the negative conductor is indicated by I' and the positive by I. For convenience of description the contact-plates of each set or series are indicated, as shown, on a single standard or plate. The positive conductor is connected with the plate G, then through the R or red circuit and to the contact-plate $g$ through the wire $i$, from which an electrical conductor $i'$ leads to the contact-plate G', from whence a wire $i^2$ leads to the W or white circuit and from thence through the wire $i^3$ connects with the contact-plates $G^2$ and $G^3$ and from the contact-plate $G^2$, by means of the wire $i^4$, leads through the remaining circuit Y, which may represent another color, such as green, blue, or any preferred effect. From said circuit Y the conductor $i^5$ leads to the contact-plate $g^2$ and is also connected with the negative wire I'. A wire $i^6$ connects the contact-plates $g^2$ and $g^3$. This arrangement insures that but one group of lights will operate at a time, as will be readily seen by tracing the circuits on Figs. 10, 11, and 12, and minimizes destructive sparking, as shown in Fig. 12.

Inasmuch as the number of brushes is one less than the number of pairs of contact-plates, it follows that each pair of contact-plates except one pair will be electrically connected through the brushes, thus short-circuiting all but one light or sign circuit when the device is in operation. When the brushes are in position indicated in Fig. 10, the current must pass through the circuit R, while the brushes short-circuit the remaining circuits, excepting R, which will then be burning. In the next interval of movement the contact-plates G' and g' are not engaged by brushes, and as a consequence the remaining contact-plates form short circuits through the brushes for the circuits R and Y, and the current passes through the circuit W. In the next interval the contact-plates $G^2$ and $g^2$ are out of contact with their brushes. The remaining contact-plates are electrically connected by said brushes. In this instance the circuits R and W are short-circuited, while the current passes through the circuit Y, producing the characteristic effect. In the next movement the contact between the contact-plates $G^3$ and $g^3$ is broken by the movement of the brush, and the remaining contact-plates are engaged by the brushes and the brushes short-circuit R and Y, and as a consequence the light-circuit W is in operation.

In all the movements of the brushes it is to be remembered that contact is made and broken very quickly, and it will be evident that inasmuch as the short circuits are formed by the brushes connecting oppositely-disposed plates at the moment of breaking contact between the brushes and the contact-plates a large amount of current is caused to pass through all the light-circuits. It will be seen that the current is never entirely interrupted, and the tendency to sparking is thus greatly reduced, as the brushes make or break the contact with the contact-plates. The interval between the making and breaking contact is so short from the construction shown that at no time is any appreciable illumination produced simultaneously in all the circuits unless desired.

Obviously any desired number of circuits may be operated at one and the same time by a given number of contact-plates by an arrangement of circuits similar to that illustrated in Fig. 9. The general arrangement with respect to the contact-plates is substantially the same as before described, with the exception that the current when applied to the circuit R illuminates both circuits R and R', the current passing first through the wires $j$ and $j'$ through R, then through $j'$ and $j^2$ to R'. In the next succeeding position the circuits W and W' are successively illuminated, the current passing through the wires $k$ $k'$ and $k'$ and $k^2$ successively. In the same manner the first-named circuits being short-circuited the circuits Y and Y' are illuminated, the current passing through the wires $l$ $l'$ and $l'$ $l^2$ respectively.

In the flasher mechanism illustrated in Fig. 7 but two contact-plates M and M' are shown. A rotative cam N is secured on the shaft and is provided with laterally-extending points, which project on each side of the brush-arm N', pivoted eccentrically with the shaft. A pushing-spring $n$ is provided, engaging one of the points of the cam and said brush-arm and acts against the resistance of the brush on the contact-plate. Stops $n'$ are provided adjacent to one end of each contact-plate against which the extremity of the brush-arm engages just previous to breaking contact with the plate. This retards the outer end of the brush-arm, while the continued rotation of the shaft carries the point of pivotal support of the arm past the center, thereby retracting the arm past the pin or stop and permitting the same to snap over to the next contact-plate, thus providing a very quick break.

In the construction shown diagrammatically in Fig. 13 and the diagrams illustrated in Figs. 14, 15, and 16 but two light-circuits are shown and two pairs of contact-plates operated by a single brush. As shown, the pairs of contact-plates are arranged concentrically, as before described, and indicated respectively by $M^2$ $M^3$ $m^0$ $m'$. The positive is connected with the light-circuit R and is also connected with the contact-plate $M^2$, and the opposite side of the circuit is connected with the inner contact-plate $m$ and the contact-plate $M^3$. The positive conductor $o$ of the circuit W is also connected with the contact-plate $M^3$, while the other conductor of the said circuit is connected with the negative and with the contact-plate $m'$. The operation of these circuits is substantially as before described. The brush in the position indicated in Fig. 13 short-circuits the light-circuit R, the current passing from the positive to the contact-plate $M^2$, brush O, contact-plate $m$ to the contact-plate $M^3$ through the circuit W and to the negative. At the moment of breaking the circuit between the brush and the contact-plates it will be seen that the current passes through both light-circuits, which are connected in series, with the effect of decreasing the tendency to produce a destructive spark, as before described. When the brush engages the contact-plates $M^3$ and $m'$, the circuit W is short-circuited, while the current passes through the circuit R. If preferred, the three-wire method may be used to connect the two circuits, as shown in Figs. 14, 15, and 16, in which Fig. 14 illustrates the condition of the circuit at the time the brush is out of engagement with the contact-plates. Fig. 15 illustrates the condition of the circuits with the brush engaged on contact-plates $M^2$ and $m$. Fig. 16 represents the condition of the circuit with the brush engaged on the contact-plate $M^3$ and $m'$.

Figure 17:
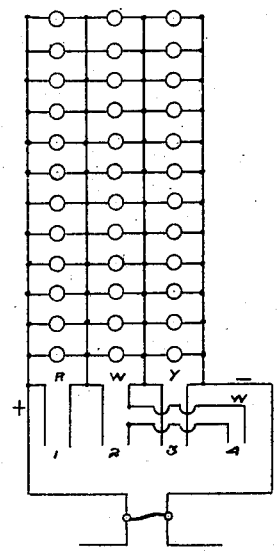
Figure 18:
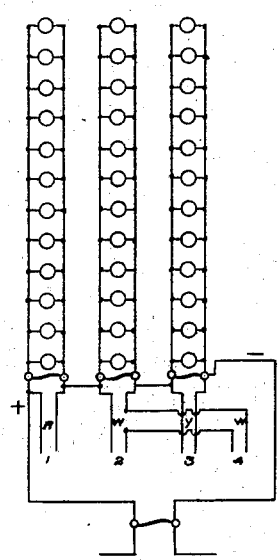
Figure 19:
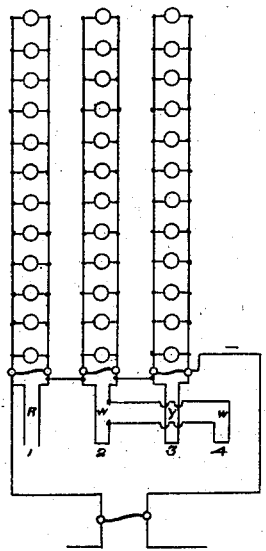
Figure 20:
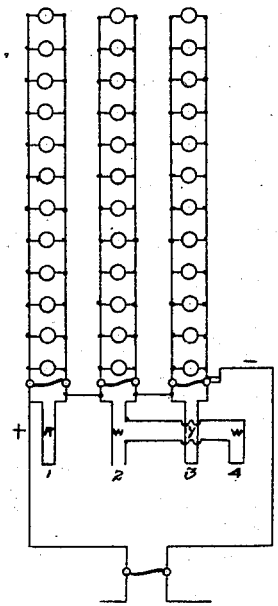
Figure 21:
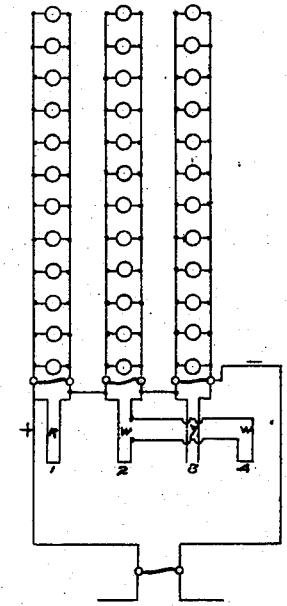
Figure 22:
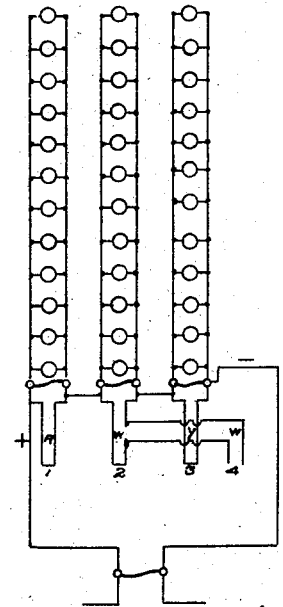

Figs. 17, 18, 19, 20, 21, and 22 illustrate more graphically the operation of the circuits such as illustrated in Figs. 10, 11, and 12, in which there are four contact-plates or sets of contact-plates and but three brushes. Fig. 17 also shows the three light-circuits connected by the three-wire system, as before described—that is to say, one of the trunk-wires is connected and used in common by two or more circuits. Fig. 18 shows all the circuits receiving the current as when the brushes are out of engagement. In Fig. 19 the circuits controlled by the contact-plates indicated by 2, 3, and 4 are short-circuited, thus causing the current to pass through the circuit R. Fig. 20 shows circuits controlled by contact-plates 1, 3, and 4 short-circuited, permitting the current to pass through the circuit W and contact-plates 4 of the W circuit. Fig. 21 shows contact-plates 1, 2, and 4 short-circuited and the current then passing through circuit Y. Fig. 22 shows the first, second, and third sets of contact-plates short-circuited, while the current passes through the fourth set of contact-plates and the brush and through the W circuit.

Obviously from the construction described any desired number of circuits may be operated from a flasher such as herein shown and described, it being possible to arrange such a flasher with any desired number of contact-plates or sets of contact-plates, which may be oppositely disposed and which may be operated by a single mechanism, the number of brushes being less than the number of circuits operated thereby.

I do not desire to be limited to the exact construction of flasher or to the exact arrangement of circuits shown, as obviously either may be varied in many ways, and brushes variously operated may be made to engage oppositely-disposed contact-plates and made to operate variously-disposed circuits and to produce any desired number of simultaneous breaks in the circuit without departing from the principles of this invention.

I claim as my invention—

1. In a device of the class described, the combination with a mechanical flasher, of a plurality of electrical circuits automatically and independently operated thereby and so connected with the flasher and with each other as to permit a current to pass through all the circuits when contact is broken in the flasher.

2. The combination with a mechanical flasher, of a plurality of electrical circuits separately operated thereby, and so arranged as to permit the current to pass successively therethrough, dependent upon the relation of the parts of the flasher and to permit the current to pass through all of said circuits when contact is broken in the flasher.

3. In a device of the class described, a flasher comprising oppositely-disposed contact-plates, a brush adapted to simultaneously engage the same and spring-operated means acting to accelerate the making and breaking of contact of the brushes with said plates, a plurality of circuits connected in said flasher and so disposed as to operate successively and independently and so connected with each other as to permit the current to pass through all the circuits when contact in the flasher is broken.

4. The combination with a rotative shaft, of oppositely-disposed contact-plates arranged concentric therewith, a plurality of brushes carried on the shaft and intermittently operated thereby, a plurality of circuits connected each with one or more contact-plates and adapted to be successively short-circuited by the brushes and means whereby when contact is broken between the brushes and the contact-plates the current passes through all of said circuits thereby acting to reduce sparking effect between the brushes and the contact-plates.

5. The combination in an electric flasher, of a rotative shaft, a plurality of contact-plates arranged concentric therewith and at intervals apart, a plurality of circuits each electrically connected with one or more contact-plates, brushes intermittently movable on and with the shaft and acting successively to short-circuit one or more of said circuits, means for operating said brushes intermittently and means whereby when said brushes are out of engagement with the contact-plates the current passes through all the circuits.

6. The combination with oppositely-disposed contact-plates, of movable brushes adapted to engage the same in pairs, said brushes being less in number than there are pairs of contact-plates, means for intermittently operating said brushes, independent circuits connected with each pair of contact-plates and adapted to be successively short-circuited by the engagement of the brushes with its contact-plates, and means whereby when the brushes are out of contact with all of said contact-plates the current passes through all of said circuits in series.

7. A flasher of the class described, comprising a rotative shaft, a sleeve movable thereon, resilient means forming the connection between said shaft and sleeve and acting intermittently to rotate the sleeve with the shaft, contact-plates disposed in pairs concentric with the shaft, brushes carried on said sleeve and adapted to contact with less than all the pairs of contact-plates simultaneously, a detent acting intermittently to hold the sleeve from rotation, and means on the shaft acting to release said detent whereby said brushes are given a variable and intermittent movement over said contact-plates.

8. The combination with a rotative shaft, of contact-plates arranged concentric therewith in pairs, a sleeve on said shaft adapted for independent movement with respect thereto, a spring forming the connection between the shaft and sleeve, brushes rigidly secured on the sleeve and movable therewith and less in number than the number of pairs of contact-plates, and means for successively engaging and releasing the sleeve during the rotation of the shaft whereby said brushes are caused successively to engage the contact-plates.

9. In a device of the class described, the combination with a plurality of insulating-standards, of a rotative shaft extending therethrough, contact-plates arranged on said standards in pairs concentric with the shaft, a sleeve rotatively engaged upon the shaft, a spring forming the connection between the sleeve and shaft, a ratchet on said sleeve, a detent adapted to engage said ratchet, means operated by the shaft for releasing the detent, thereby giving the sleeve an intermittent motion, brushes engaged on the sleeve, and insulated therefrom, said brushes being less in number than there are pairs of contact-plates on standards and circuits connected with each pair of contact-plates and adapted to be successively operated and short-circuited by the movement of the brushes, and means whereby when contact is broken between the contact-plates and brushes all of said circuits receive the current.

10. The combination with insulating-standards arranged in pairs, of a rotative shaft extending therethrough, contact-plates arranged concentric therewith on the adjacent faces of said standards and also in pairs, brushes carried and intermittently movable on said shaft between each pair of contact-plates and numbering less than there are pairs of contact-plates to be engaged thereby, a plurality of electrical circuits each connected with a pair of contact-plates and of which one receives the current when the contact-plates of the others are engaged by the brushes and electrical connections between all the circuits whereby the current passes through all the circuits when the brushes break contact with the contact-plates.

11. The combination in a plurality of electrical circuits connected in series, of a mechanical flasher adapted to operate each independently and adapted to break circuit simultaneously at a plurality of points at which time the current passes through all the circuits for an immeasurably brief period of time.

12. The combination in a mechanical flasher, of a plurality of pairs of oppositely-arranged contact-plates, movable brushes so arranged for any brush to engage any pair of contact-plates in its series, and all adapted to break contact with the contact-plates simultaneously.

13. The combination with a plurality of electrical circuits, of a mechanical flasher embracing means for short-circuiting one or more of said circuits simultaneously comprising parts acting to open and close a plurality of said circuits effecting a quick break at a plurality of points simultaneously.

14. The combination with a plurality of independent circuits connected together in series and arranged with one or more loops adapted to permit short-circuiting, of automatic means acting to produce variations in the sequence of the operation of the circuits whereby one or more of the circuits may be made to operate oftener than the others.

15. The combination in an electrical flasher, of a plurality of oppositely-disposed contact-plates arranged with their ends in proximity each to each, of a plurality of connected brushes arranged to approximately simultaneously break contact with certain of said plates and make contact with others thereby providing for a minimum interruption of current.

In witness whereof I have hereunto subscribed my name in the presence of two subscribing witnesses.

HENRY C. HORSTMANN.

In presence of—
C. W. HILLS,
ALFRED C. ODELL.